Oct. 28, 1947.  G. W. JOHNSON  2,429,628
POULTRY PLUCKING MACHINE
Filed May 29, 1945  2 Sheets-Sheet 1

INVENTOR,
Gordon W. Johnson.
BY
Roy E. Hamilton,
Attorney.

Oct. 28, 1947.     G. W. JOHNSON     2,429,628

POULTRY PLUCKING MACHINE

Filed May 29, 1945     2 Sheets-Sheet 2

INVENTOR,
Gordon W. Johnson.
BY
Roy E. Hamilton,
Attorney.

Patented Oct. 28, 1947

2,429,628

UNITED STATES PATENT OFFICE 2,429,628

POULTRY PLUCKING MACHINE

Gordon W. Johnson, Raytown, Mo., assignor to Gordon Johnson Company, Kansas City, Mo., a corporation of Missouri Application May 29, 1945, Serial No. 596,433

5 Claims. (Cl. 17—11.1)

This invention relates to improvements in poultry picking machines and has particular reference to the rotary drum type.

The principal object of the present invention is the provision of a poultry plucking machine having a series of elastic members provided with feather engaging fingers carried by a rotary member and disposed in spaced apart pairs along one face of the respective elastic members.

Another object of this invention is the provision of a poultry plucking machine including a rotatably mounted member having a pair of spaced apart discs with elongated elastic members secured therebetween under tension and adapted to be forced outwardly by centrifugal force as the carrying member is rotated, said elastic members being provided with feather engaging fingers disposed in pairs with the pairs spaced apart along the elastic member.

A further object of this invention is the provision of a series of elongated elastic bars, each bar having feather engaging fingers disposed in pairs with the pairs spaced apart with flexible members engaging said elastic bar between each of said pairs of fingers, whereby said elastic bar is limited in its outward movement as said elastic member is rotated about an axis parallel therewith.

Other objects are simplicity and economy of construction, efficiency of operation and adaptability for use in plucking the various types of poultry.

With these objects in view as well as other objects which will appear during the course of the specification, reference will now be had to the drawings, wherein.

Figures 1, 2:
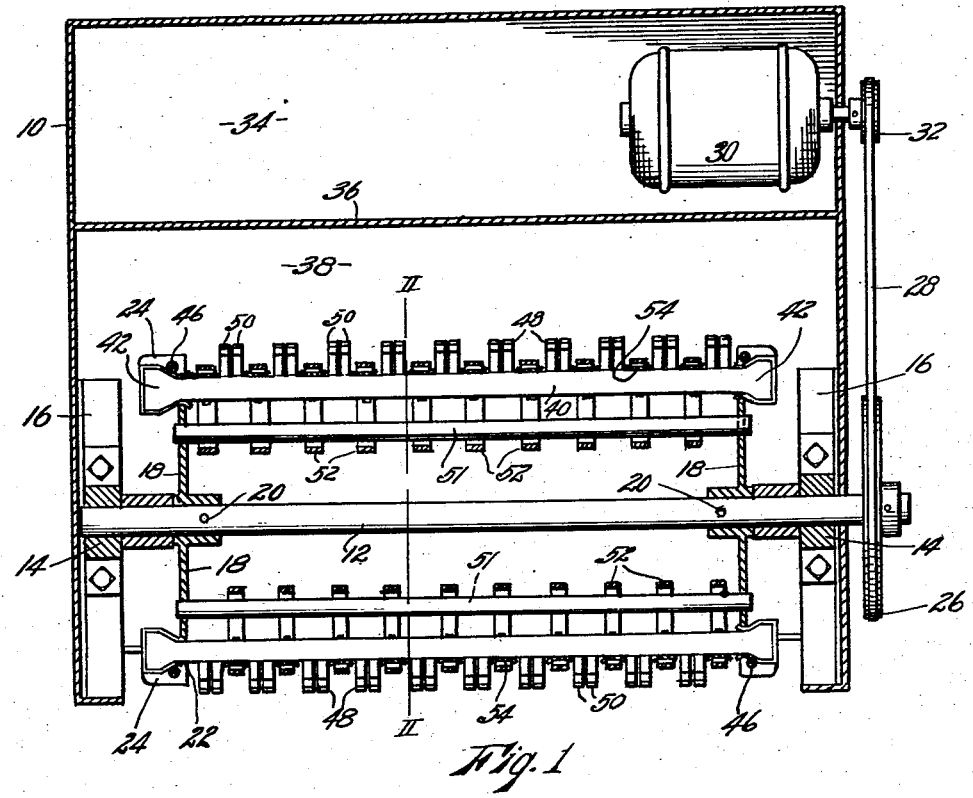
Fig. 1 is a sectional plan view of a poultry plucking machine embodying the novel features of this invention.
Fig. 2 is a cross sectional view taken on line II—II of Fig. 1.
Figure 3:
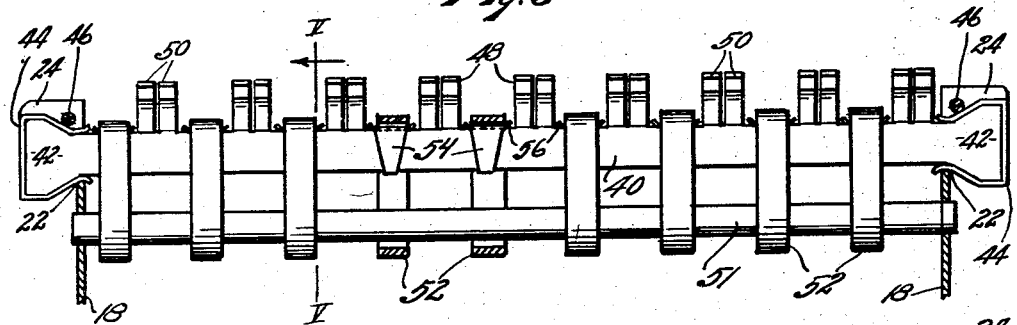
Fig. 3 is an enlarged side elevational view of one of the elastic members mounted on the supporting members shown partly in section.
Figure 4:
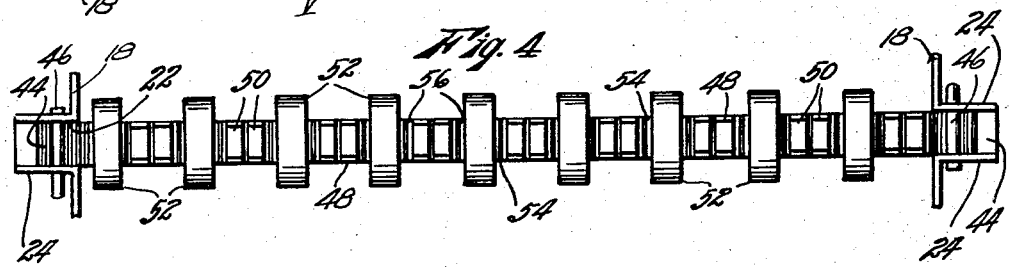
Fig. 4 is a plan view of the parts shown in Fig. 3.
Figure 5:
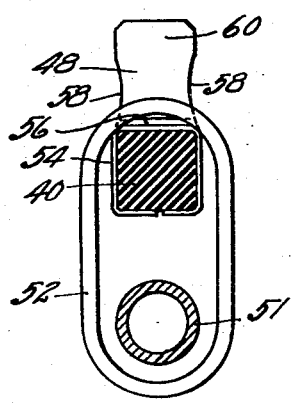
Fig. 5 is an enlarged sectional view taken on line V—V of Fig. 3.
Figure 6:
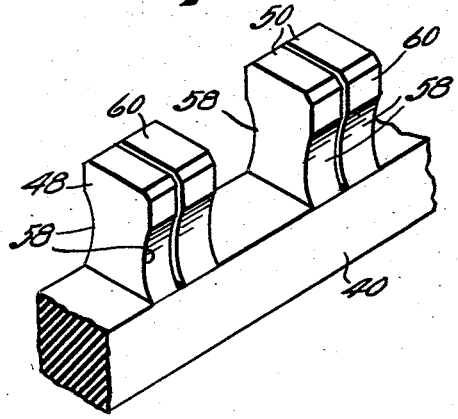
Fig. 6 is a fragmentary perspective view of a section of the elastic bar showing two pairs of fingers.
Figure 7:
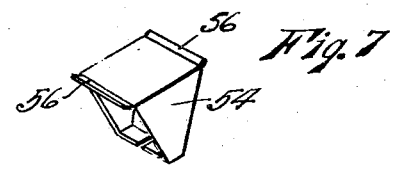
Fig. 7 is a perspective view of one of the metal wear clamps for protecting the elastic bar against wear during the picking operation.

Throughout the several views like reference characters refer to similar parts and the numeral 10 designates a frame or housing wherein is mounted a shaft 12 for rotation in bearings 14 carried by brackets 16 which in turn are secured to the housing 10. This shaft 12 is provided adjacent its opposite ends with discs 18 which are secured thereto by a pin 20. These discs are notched at their outer peripheries at 22 and provided with out-turned flanges 24. Each of the discs is provided with a like number of notches 22 and these notches are equally spaced throughout the entire periphery of the discs. One end of shaft 12 extends outwardly through housing 10 and is provided with a belt wheel 26 which is driven by means of a belt 28 which in turn is driven by the motor 30 through the belt wheel 32. This motor 30 is carried on a platform 34 behind a partition 36 which separates it from the picking compartment 38.

Mounted on discs 18 is a series of spaced apart elastic bars 40 which are in substantially parallel relation with shaft 12 for rotation therewith. Each elastic bar has enlarged end portions 42 provided with a cap 44. These heads are adapted to fit into slots 22 and are secured therein by transverse pins 46 which engage in flanges 24 to rest against the reduced portion of end portions 42 whereby the bar is secured under any desired tension between said discs. Each elastic bar has a series of feather engaging fingers 48 which are disposed in pairs 50 with the pairs spaced apart on the outer face of the bar. The fingers of each pair are spaced apart a relative short distance longitudinally of the bar so as to present two adjacent fingers that are adapted to be flexed independently in the direction of rotation to adjust themselves to the irregular contour of the fowl carcass. These feather engaging fingers may be moulded in pairs or moulded as one finger and then slit or slotted to form a pair of substantially like fingers which are relatively narrow longitudinally of the bar, as shown. These fingers of each pair are sufficiently close together to practically contact the fowl's carcass the full width of said pair, and also present sufficient combined weight and body of rubber to properly remove the feathers without bruising or scuffing the bird.

It will be observed that the pairs of fingers are spaced apart at least a distance equal to the combined width of the pair of fingers, furthermore, the pairs of fingers on adjacent bars are disposed in offset relation so that the fowl carcass is thoroughly contacted by the fingers as it is held against the rotating drum. It has been found practical to slightly recess the body of each finger at 58 to permit easier flexing thereof whereby the finger head 60 is given better picking action.

Since the bars 40 are elastic and the picking drum is rotated at a speed sufficient to set up a centrifugal action to extend the said bars, it is necessary to provide means to limit the outward movement of the bars and to maintain all the bars in substantially like distance from the axis of revolution throughout the length of the bar. For this purpose, rods 51 are mounted in the discs 18 in substantially parallel relation with, and equi-distant from each of the bars 40 and the axle shaft 12. Flexible bands 52 are positioned respectively about said elastic bar and the adjacent rod, as clearly shown to permit a predetermined outward travel of the bars 40. It will be noted that a band 52 is provided for each pair of fingers above the entire length of the bar to maintain the drum in balance and alignment. These bands are pliable but are substantially non-elastic to properly limit the movement of the parts due to centrifugal force. A guard clip 54 is positioned about said bar between adjacent pairs of fingers to serve as a bearing surface for bands 52 whereby the elastic bar will be protected against undue wear. Clips 54 have up-turned flanges 56 for normally positioning the bands 52 in spaced relation to the fingers 48.

This type of feather engaging drum adjusts itself more readily to the contour of the carcass and removes the feathers without scuffing or bruising the bird. While the fingers normally ride in a substantially radial position, yet it is quite apparent that when they contact the bird they will be inclined to the radial line, so that when the contact is released they will flip back to the normal position or against the bird.

Having thus described my invention, what I claim as new and desire to be secured by Letters Patent is:

1. In a poultry plucking machine, a rotatably mounted shaft having a pair of spaced apart axially disposed discs, elongated elastic members secured between said discs in substantially parallel relation to said shaft, and feather engaging fingers disposed in pairs with the pairs spaced apart along each of said elastic members.

2. In a poultry plucking machine, a rotatably mounted member having a pair of spaced apart discs, elongated elastic members secured under tension between said discs and adapted to be forced outwardly by centrifugal force as said rotatable member is rotated, and feather engaging fingers disposed in pairs with the pairs spaced apart along each of said elastic members.

3. In a poultry plucking machine, a rotatably mounted axle having a pair of spaced apart axially disposed end members, an elongated elastic member secured under tension between said end members, feather engaging fingers disposed in pairs with the pairs spaced apart along said elastic member, and means to limit the outward movement of said elastic member as said axle is rotated.

4. In a poultry plucking machine, a rotatably mounted axle having a pair of spaced apart axially disposed end members, elongated elastic members secured under tension between said end members, feather engaging fingers disposed in pairs with the pairs spaced apart along each of said elastic members, a rod fixed to said end members and disposed parallel with said axle between said axle and each of said elastic members, and a series of flexible bands positioned around each of said rods and the adjacent elastic members between each of said pairs of fingers whereby the outward movement of said elastic members is limited as said axle is rotated.

5. In a poultry plucking machine, a rotatably mounted axle having a pair of spaced apart axially disposed end members, an elongated elastic member secured under tension between said end members, feather engaging fingers disposed in pairs with the pairs spaced apart along said elastic member, a rod fixed to said end members and disposed parallel with said axle between said axle and said elastic member, a series of flexible bands positioned around said rod and said elastic member between each of said pairs of fingers whereby the outward movement of said elastic member is limited as said axle is rotated, and metal clips positioned about said elastic member between adjacent pairs of fingers to serve as guards for said flexible bands.

GORDON W. JOHNSON.